United States Patent
Stuckey (10) Patent No.: US 6,683,735 B2
(45) Date of Patent: Jan. 27, 2004

(54) RAPIDLY CHANGING DICHROIC BEAMSPLITTER IN EPIFLUORESCENT MICROSCOPES

(75) Inventor: Jeffrey A. Stuckey, Jeffersonville, PA (US)

(73) Assignee: Universal Imaging Corporation, Downington, PA (US)

( * ) Notice: Subject to any disclaimer, the term of this patent is extended or adjusted under 35 U.S.C. 154(b) by 33 days.

(21) Appl. No.: 09/988,889

(22) Filed: Nov. 19, 2001

(65) Prior Publication Data

US 2002/0085293 A1 Jul. 4, 2002

Related U.S. Application Data

(63) Continuation of application No. PCT/US01/42957, filed on Nov. 16, 2001.
(60) Provisional application No. 60/249,626, filed on Nov. 17, 2000.

(51) Int. Cl.$^7$ .................................................. G02B 5/04
(52) U.S. Cl. ........................ 359/831; 359/832; 359/833
(58) Field of Search .................................. 359/831, 832, 359/833, 639, 640, 368, 634; 356/417, 418, 310, 311, 319, 320, 325; 250/458.1, 459.1, 461.1, 461.2

(56) References Cited

U.S. PATENT DOCUMENTS

| 4,795,256 A | 1/1989 | Krause et al. ............... 356/320 |
| 4,900,934 A | 2/1990 | Peeters et al. ............. 250/461.2 |
| 4,917,478 A | 4/1990 | Petran et al. ................ 350/527 |
| 4,946,279 A | 8/1990 | Ohkubo ...................... 356/318 |
| 5,029,955 A | 7/1991 | Chu ............................ 350/6.5 |
| 5,233,197 A * | 8/1993 | Bowman et al. .......... 250/461.1 |
| 5,332,905 A | 7/1994 | Brooker et al. ........... 250/458.1 |
| 5,406,405 A | 4/1995 | Sullivan ..................... 359/223 |
| 5,491,343 A | 2/1996 | Brooker ................... 250/458.1 |
| 5,875,043 A | 2/1999 | Ito ............................. 358/475 |
| 5,936,728 A | 8/1999 | Bouzid ....................... 356/318 |
| 6,057,967 A | 5/2000 | Takahashi et al. .......... 359/641 |
| 6,309,078 B1 | 10/2001 | Dromaretsky et al. ...... 359/872 |

FOREIGN PATENT DOCUMENTS

| GB | 2355354 | 8/2000 | ............ G02B/7/32 |
| GB | 2360162 | 1/2001 | ........... G02B/21/00 |
| WO | WO 93/10259 | 11/1992 | ............ C12Q/1/24 |
| WO | WO 98/07022 | 8/1997 | .......... G01N/21/64 |
| WO | WO 99/08233 | 8/1998 | ............ G06T/7/00 |

(List continued on next page.)

OTHER PUBLICATIONS

Bright, G.R. (1993) "Multiparameter Imaging of Cellular Function" in "Fluorescent and Luminescent Probes of Biological Activity," Mason, W.T., ed., Academic Press, ISBN 0–12–47829–1, Chap. 14, pp. 204–215.

Wodnicki, P., Locketts, S., Pillai, M.R., Halabi, S., McKalip, A., Herman, B. (1996) "Automated Image Microscopy," Want, X.F. and Herman, B. eds., Wiley, ISBN 0–471–01527–X, Chap. 2, pp. 31–54.

Primary Examiner—Mohammad Sikder
(74) Attorney, Agent, or Firm—Gerry J. Elman; Elman Technology Law P.C.

(57) ABSTRACT

An epifluorescent microscope (11) is constructed with a quick changing set of filters (13,20,21). A wheel (13) containing a plurality of dichroic beamsplitter mirrors (6165) mounted equidistance from a center axis (66) of the wheel is mounted at a 45° angle within the lightpath and provides a beamsplitter function. Light from an excitation source (12) is provided as monochromatic light, so that light from the excitation source (12) is reflected by a selected one of the dichroic mirrors (6165) to the specimen (15), and Stokes shifted light from the specimen (15) is transmitted through the dichroic mirror (6165). By separately mounting the dichroic mirrors (6165), the dichroic mirrors can be quickly moved and a quicker change of sensed fluorophores is achieved. An additional advantage is that excitation (20) and emission (21) filters can be quickly changed independently of the dichroic mirror element (13).

10 Claims, 4 Drawing Sheets

FOREIGN PATENT DOCUMENTS

| | | | |
|---|---|---|---|
| WO | WO 00/03246 | 7/1999 | .......... G01N/33/53 |
| WO | WO 00/17624 | 9/1999 | .......... G01N/15/14 |
| WO | WO 00/17643 | 9/1999 | .......... G01N/33/53 |
| WO | WO 00/26408 | 10/1999 | ............ C12Q/1/68 |
| WO | WO 00/49540 | 2/2000 | ........... G06F/17/50 |
| WO | WO 00/50872 A3 | 2/2000 | .......... G01N/15/14 |
| WO | WO 00/50872 | 2/2000 | .......... G01N/15/14 |
| WO | WO 00/60356 | 3/2000 | ........ G01N/33/543 |
| WO | WO 00/63679 A3 | 4/2000 | .......... G01N/21/64 |
| WO | WO 0063679 | 4/2000 | .......... G01N/21/64 |
| WO | WO 00/70342 | 5/2000 | .......... G01N/33/50 |
| WO | WO 00/72258 A2 | 5/2000 | |
| WO | WO 00/79241 A2 | 6/2000 | .......... G01N/15/14 |
| WO | WO 01/07891 A2 | 7/2000 | .......... G01N/15/00 |
| WO | WO 01/07891 A3 | 7/2000 | .......... G01N/33/50 |
| WO | WO 01/08036 A2 | 7/2000 | .......... G06F/17/00 |
| WO | WO 01/11340 A1 | 8/2000 | .......... G01N/15/14 |
| WO | WO 01/11341 A2 | 8/2000 | .......... G01N/15/14 |
| WO | WO 01/35072 A2 | 11/2000 | .......... G01N/15/14 |
| WO | WO 01/40436 A2 | 12/2000 | |
| WO | WO 01/59149 A2 | 2/2001 | ............ C12Q/1/00 |
| WO | WO 01/88593 A1 | 5/2001 | ........... G02B/21/26 |

* cited by examiner

RAPIDLY CHANGING DICHROIC BEAMSPLITTER IN EPIFLUORESCENT MICROSCOPES

CROSS REFERENCE TO RELATED APPLICATIONS

This application claims priority from U.S. Provisional Patent Application No. 60/249,626, filed Nov. 17, 2000 and is a continuation of International Patent Application PCT\US01\42957 filed Nov. 16, 2001. The entire contents of both of the aforementioned patent applications are incorporated herein by reference.

BACKGROUND OF THE INVENTION

This invention relates to fluorescent microscopy, and more particularly to the rapid selection of filters for measuring fluorescence at different wavelengths or Stokes shifts.

The phenomenon of fluorescence describes light emission that continues only during the absorption of the excitation light by a chromophore or other conjugated molecule, which is capable of emitting secondary fluorescence. Reflected light fluorescence microscopy is a favored technique in fluorescence microscopy. This mode of fluorescence microscopy is also known as incident light fluorescence, fluorescence, or scopic fluorescence. The universal reflected light vertical illuminator is interposed between the observation viewing tubes and the nosepiece carrying the objectives. A key feature of fluorescence microscopy is its ability to detect fluorescent objects that are sometimes faintly visible or even very bright relative to the dark (often black) background. In order to optimize this feature, image brightness and resolution must be maximized. Multiphoton fluorescence microscopy is a powerful research tool that combines the advanced optical techniques of laser scanning microscopy with long wavelength multiphoton fluorescence excitation to capture high-resolution, three-dimensional images of specimens tagged with highly specific fluorophores.

While fluorescence is described, the invention can be used with any type of photoluminescence, provided that the material under observation exhibits a Stokes shift.

Fluorescence microscopy can be used for specimens, which exhibit autofluorescence, and for specimens enhanced by fluorochromes, also called fluorophores. The basic task of the fluorescence microscope is to permit excitation light to irradiate the specimen and then to separate the much weaker re-radiating fluorescent light from the brighter excitation light. Thus, only the emission light reaches the eye or other detector. The resulting fluorescing areas shine against a dark background with sufficient contrast to permit detection. The darker the background of the non-fluorescing material, the more efficient the instrument. Therefore efficient filters are desired.

When a fluorescing sample is observed with a fluorescence microscope. Ultraviolet (UV) light of a specific wavelength or set of wavelengths is produced by passing light from a UV-emitting source through the exciter filter. The filtered UV light illuminates the specimen, in this case a crystal of fluorspar, which emits fluorescent light when illuminated with ultraviolet light. Visible light emitted from the specimen, red in this case, is then filtered through a barrier filter that does not allow reflected UV light to pass. It should be noted that this is the only mode of microscopy in which the specimen, subsequent to excitation, gives off its own light. The emitted light re-radiates spherically in all directions, regardless of the direction of the exciting light.

For a given fluorochrome, the manufacturer indicates the wavelength for the peak of excitation/fluorescence intensity and the wavelength for the peak of emission/fluorescence intensity. To determine the emission spectrum of a given fluorochrome, the dye absorption maximum wavelength is found and the fluorochrome is excited at that maximum. The dye absorption maximum wavelength is usually the same as the excitation maximum. The absorption spectrum of a typical fluorochrome occurs where the relative intensity of absorption is plotted against relative wavelength. A monochromator is then used to scan the fluorescence emission intensity at successive emission wavelengths. The relative intensity of the fluorescence is measured at the various wavelengths to plot the emission spectrum. The excitation spectrum of a given fluorochrome is determined in a similar manner. The emission maximum is chosen and only emission light at that emission wavelength is allowed to pass to the detector. Then excitation is induced at various excitation wavelengths and the intensity of the emitted fluorescence is measured. There is usually an overlap at the higher wavelength end of the excitation spectrum and the lower wavelength end of the emission spectrum. This overlap of excitation and emission intensities/wavelengths must be eliminated in fluorescence microscopy. Elimination of the overlap of excitation and emission intensities/wavelengths is accomplished by means of appropriate selection of excitation filter, dichromatic beamsplitter, and excitation or barrier filter. Otherwise, the much brighter excitation light overwhelms the weaker emitted light and significantly diminishes specimen contrast.

The separation of excitation and emission wavelengths is achieved by the proper selection of filters to block or pass specific wavelengths. The design of fluorescence illuminators is based on control of excitation light and emission light by readily changeable filter insertions in the optical pathway on the way toward the specimen and then emanating from the specimen.

A dichroic material is one which absorbs light polarized in one direction more slowly than light polarized at right angles to that direction. Dichroic materials are to be distinguished from birefringent materials, which may have different refractive indexes for two electric vectors vibrating at right angles to each other but similar, if negligible, absorptions coefficients. The term dichroic is also used to denote the change in color of a dye solution with change in concentration, to denote a color filter that has two transmission bands in very different portions of the visible region and hence changes color when the spectral distribution of the illuminating source is changed, and to denote an interference filter that appears to be of a different color when viewed in reflected or transmitted light.

As used in this disclosure, "dichroic beamspiitter" refers to a mirror, which reflects most light below a predetermined wavelength and transmits light above that wavelength. Thus, in one sense the invention may use a dichroic filter, which is an interference filter that appears to be of a different color when viewed in reflected or transmitted light.

Dichroic filters are filters having or showing two colors. This can be obtained with doubly-refracting crystals that exhibit different colors when viewed in different directions or with solutions that show essentially different colors in different degrees of concentration.

In addition, while dichroic materials are described, the invention may be used with birefringent materials and other types of filters.

The functions of a dichroic element in a system used to analyze fluorescent labels in samples include directing light from a light source toward the sample under observation, and transmitting light reflected from the sample. By limiting the reflection to a predetermined color, it is possible to specifically detect reflected light within a predetermined waveband.

When using two or more fluorescent labels or fluorophores, it is necessary to provide dichroic beamsplitter mirrors for each of the fluorescent labels. It is further desired to detect these fluorescent labels separately. While the fluorescent labels are detected separately, there should not be a significant time difference between the detection of the different fluorescent labels. Optimally, it would be desirable to simultaneously detect the different fluorescent labels. If simultaneous detection is not practical, then the sequence of detecting the different fluorescent labels should be rapid enough that the end effect is similar to that of simultaneous detection.

In a particular type of fluorescence microscope, a dichroic beamsplitter mirror is used in combination with an excitation filter and an emission filter, sometimes referred to as a barrier filter. The excitation filter filters the excitation light to provide a monochromatic output, and the emission filter filters light transmitted through the dichroic mirror. The dichroic beamsplitter mirror and the emission filter are selected according to the Stokes shift of the fluorophores under observation.

Current fluorescent microscope designs employ an incident light or fluorescent design where a dichroic beamsplitter or chromatic mirror is mounted in a filter cube at a 45 degree angle to the excitation light path. The beamsplitter or chromatic mirror is used to reflect shorter excitation wavelengths of light onto the specimen while passing longer emission wavelengths to the eyepieces or camera. The beamsplitter has a cutoff wavelength or frequency which is between an excitation wavelength or frequency and an emission wavelength or frequency of the fluorescent material being sensed.

In addition to the dichroic beamsplitter, a monochromatic light source is provided at an excitation frequency, and a notch filter at an emission frequency is used at the sensing unit. The wavelengths of the monochromatic light source and the filter at the sensing unit generally correspond to the excitation wavelength and the emission wavelength of the fluorescent material being sensed. In the typical implementation the monochromatic light source is provided by using a notch filter to block emissions from a high intensity lamp at wavelengths above and below a selected excitation wavelength.

Many fluorescence microscopy applications require two or more fluorescent labels to be present in the specimen. Each label has its own excitation and emission spectra, and thus requires different excitation and emission filters, as well as a different dichroic beamsplitter.

To date two approaches to using multiple fluorophores have been employed:
1) Use dichroic beamsplitters that have multiple cut-off wavelengths. Thus a single dichroic can be used with multiple fluorophores. However because of bandwidth restrictions, total light throughput is reduced, thus creating longer exposure times when working with a camera. Longer exposure times translate into longer acquisition duty cycles, which is problematic in paradigms requiring repetitive high-speed data acquisition, such as screening applications and applications using living cells.
2) Motorized filter cube changers. Several commercially available microscopes employ motorized filter cube changers. These allow the use of a single dichroic for each fluorophore. However switching time is slow (12 seconds) which creates problems when using multiple fluorophores in paradigms requiring repetitive high-speed data acquisition. The slow switching time is the result of the significant mass of the motorized filter cubes. Increased speed of switching would require a substantial increase in power and control of reaction forces caused by the movement of the cubes during switching.

Dichroic beamsplitter mirrors are available with two or more cutoff wavelengths. This results in an ability to use such a beamsplitter with a first set of excitation and emission filters corresponding to a first cutoff wavelength to sense a first fluorophore, and to use the same beamsplitter mirror with a second set of excitation and emission filters with a second combined cutoff wavelength to sense a second fluorophore. This becomes difficult to accomplish if the beamsplitter mirror is provided in a filter cube.

SUMMARY OF THE INVENTION

According to the present invention, an optical system for a microscope, which includes an illumination source, microscope optics for obtaining a magnified image, and a beamsplitter changer is able to rapidly effect changes in Stokes shift wavelengths being detected. A plurality of dichroic beamsplitter elements ("dichroic beamsplitters") are arranged about a center axis at a preferred angle such as 45° to the lightpath of the microscope optics, or optical pathway. The beamsplitter elements are rotable about the center axis to allow positioning a selected one of the dichroic beamsplitter elements in a part of the light path between the illumination source and the microscope optics, with the light path resulting in reflection of light from the illumination source to a specimen under observation, and transmitting light received through the microscope optics from the specimen. When the selected dichroic element corresponds to a fluorescent material under observation, the dichroic beamsplitter reflects excitation light at an excitation wavelength corresponding to the fluorescent material under observation and the dichroic element transmits light shifted in wavelength by a Stokes shift of the fluorescent material under observation. Rapid positioning of the dichroic filter is achieved by a motor and motor controller, which rotates the filter about the center axis.

DETAILED DESCRIPTION

Overview

According to the invention a device is used for rapidly changing dichroic beamsplitters in fluorescent microscopes. The device is a high-speed wheel in which dichroic beamsplitter mirrors are mounted. The high-speed dichroic changer is mounted in a fluorescent microscope, and the changer is under computer control. Computer software can command the changer to rotate different dichroic beamsplitters into the fluorescent lightpath so that the appropriate dichroic is in position when a particular fluorophore is imaged. The present invention provides a microscope system in which the device is commanded by the software to change dichroic beamsplitters.

In one aspect of the invention, separate excitation filters and emission filters are provided, also on wheels, so that it is possible to select a particular dichroic beamsplitter and a set of excitation and emission filters. The changing of the filters may be simultaneously executed, except in cases where it is desired to retain the same dichroic beamsplitter while changing the excitation and emission filters.

According to a particular aspect of the present invention, round dichroic beamsplitters are mounted in a high-speed filter wheel. The invention is suited for use with any size or shape dichroic beamsplitter that matches the optical path of the microscope or other sensing instrument.

The wheel is capable of switching between adjacent dichroics in 50 msec or faster. The wheel in the current implementation is driven by a DC stepper motor and is under computer control. Switching time is a function of wheel mass and motor speed. Any motor-wheel combination that allowed faster switching times may be used. It is also conceivable that a galvanometer could drive a wheel at much higher speeds, or that a galvanometer could also move dichroic beamsplitters mounted on a spindle.

The wheel is mounted at a 45 degree angle inside the microscope such that when a given dichroic is selected the opening holding that dichroic is rotated into the fluorescent light path, and the selected dichroic beamsplitter is at 45 degree angle to the excitation light, although other angles may be chosen provided that transmission and reflection efficiency is maintained.

A separate set of filters are preferably used as excitation filters and a separate set of filters are preferably used as emission filters. These separate filters are notch filters, which cooperate with the dichroic beamsplitter in order to selectively sense particular fluorophore or other fluorescent sources.

In a particular aspect of the invention, the monochrome source is separate from the microscope, with excitation light transmitted by an optical waveguide. The excitation filter may be located at the light source or may be mounted at the microscope itself.

According to a particular aspect of the invention, this design this allows optimized throughput for each fluorophore while at the same time being able to switch the dichroics rapidly. Optimized throughput is advantageous as it allows for shorter camera exposure times, which decreases duty cycle as well as helps reduce photobleaching. Being able to rapidly switch the dichroic beamsplitter reduces the interval between image acquisitions, thus reducing duty cycle.

According to another particular aspect of the invention, the dichroic beamsplitter is provided as a dual cut-off beamsplitter, or as a multiple cut-off beamsplitter. This permits the use of a larger number of selectable beamsplitters on the wheel. Control of the beamsplitter wheel and the excitation filter and emission filter wheels may be provided with a common control function, provided that the use of the same beamsplitter with two different sets of excitation and emission filters are accommodated.

Description

Figure 1:
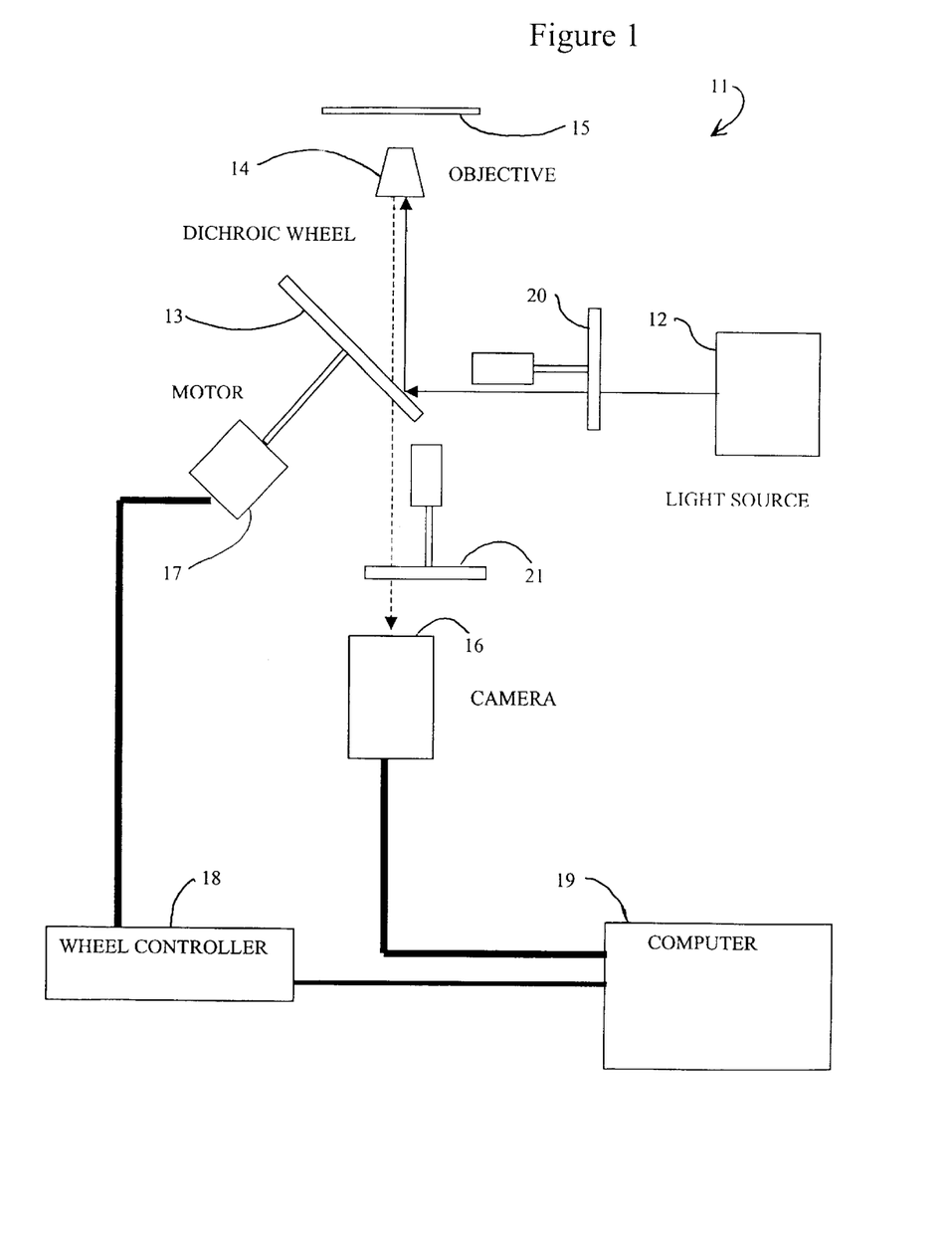
FIG. 1 is a system schematic showing some key components of an analysis microscope constructed according to the present invention.

FIG. 1 is a system schematic showing some key components of an analysis microscope 11 constructed according to one aspect of the invention. The microscope includes a light source 12, a dichroic beamsplitter wheel 13, and an objective 14, which is aligned with a specimen 15. light from the light source 12 is reflected at the dichroic wheel 13, and passes through the objective 14. Light reflected or fluorescing from the specimen 15 again passes through the objective 14, and that light, which passes through the dichroic wheel 13 is received by the camera 16. Still referring to FIG. 1, the dichroic wheel 13 is rotationally positioned by a stepper motor 17, which is controlled by motor controller 18. The motor controller 18 is responsive to a computer 19, and the computer 19 also receives images from the camera 16.

In addition, an excitation filter wheel 20 and an emission filter wheel 21 are provided. The excitation filter wheel 20 includes notch filters, which pass a monochromatic output from the light source 12. The emission filter wheel 21 includes notch filters. The emission filter wheel 21 is placed between the dichroic wheel 13 and the camera 16, and admit Stokes shifted light. If the filters on the excitation and notch filter wheels 20,21 were substantially more efficient, it would be possible to sense fluorescence without the use of the dichroic wheel 13. As it is, the amount of light transmitted outside of the wavelengths of the excitation and notch filters 20,21 is sufficiently high that the dichroic wheel is used to advantage.

The excitation filter wheel 20 is located in the light path between the light source 12 and the dichroic wheel 13. In prior art arrangements, which used dichroic cubes, the excitation filter is mounted on the cube, which places it in an enclosure housing for the microscope. In the preferred embodiment, the light source 12 includes a light, which is in a separate lightbox, connected to the microscope housing via a fiberoptic waveguide. The excitation filter wheel 20 is located in the separate lightbox, although it is understood that the excitation filter could be placed inside the microscope housing instead.

Since the signal from the camera 16 is received by the computer 19, which operates the motor controller 18, the signal from the camera 16 is easily coordinated with the position of the dichroic wheel 13.

In one aspect of the invention, the excitation and emission filters 20,21 are also provided on filter wheels. A separate pair of motor controllers 22,23 are provided so that it is possible to change the excitation and notch filters on the excitation and notch filter wheels 20,21 without changing the dichroic filter on wheel 13.

Figure 2:
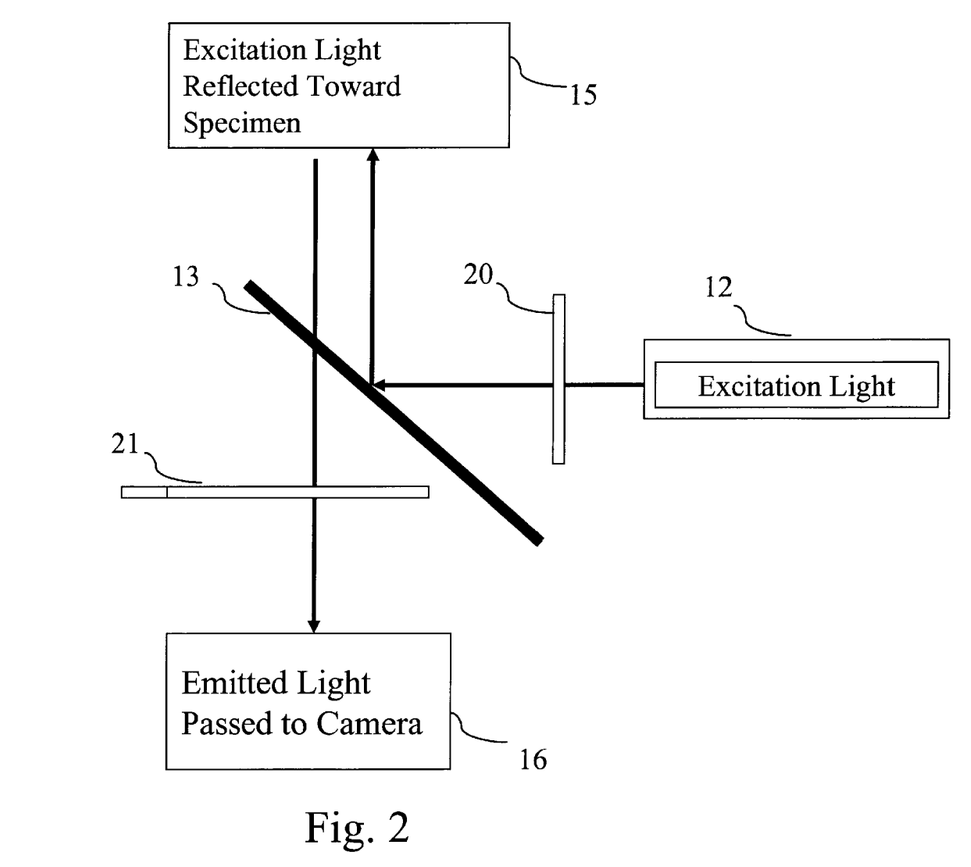
FIG. 2 is a schematic drawing showing fluorescent light paths occurring in the system of FIG. 1.

FIG. 2 is a schematic drawing showing fluorescent light paths. Light from the light source 12 is reflected by the dichroic beamsplitter wheel 13, which is at a reflection angle, which determines the lightpath. In the exemplary embodiment, a 45 degree angle is used as the reflection angle, although since standard dichroic cubes with the 45 degree angle are not used, it is likely that other reflection angles can be used. The return light, if it is able to pass the dichroic wheel 13, is received by the camera 16. This sequence generally corresponds to fluorescent microscope designs, which employ a dichroic beamsplitter or a chromatic mirror mounted in a filter cube at a 45 degree angle to the excitation light path. Significantly the filter cube is not required.

Figure 3:
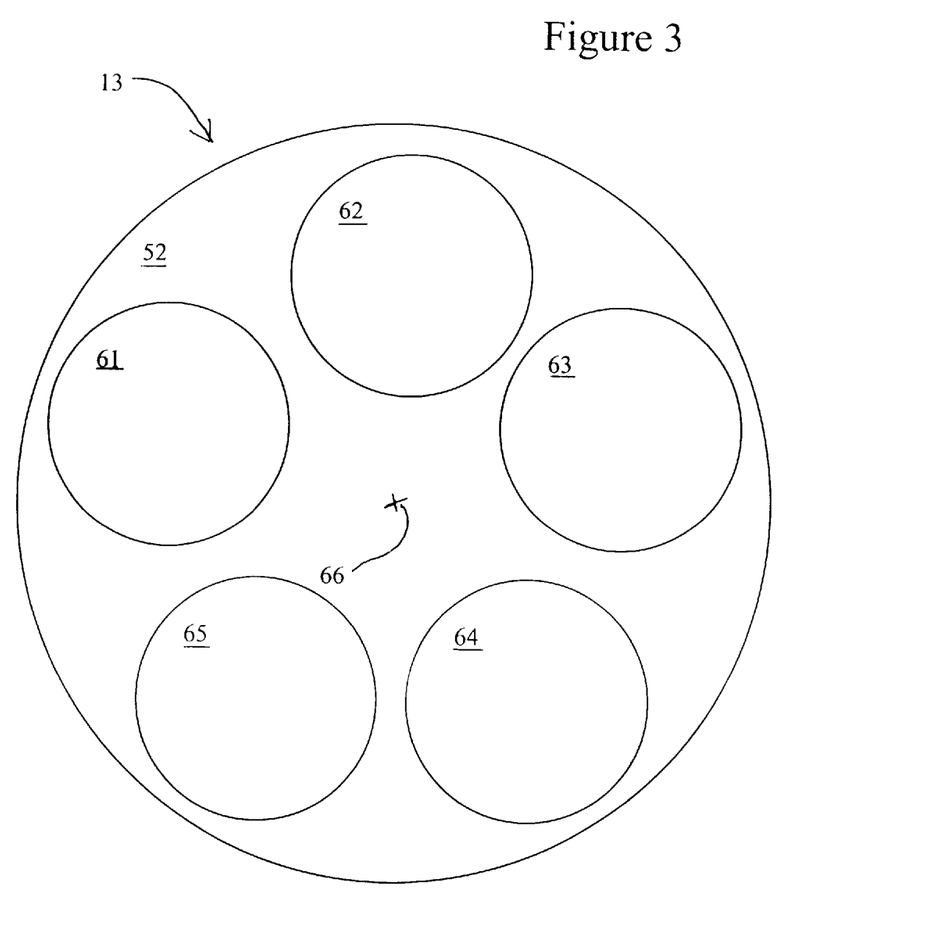
FIG. 3 is a top view showing the arrangement of a high-speed dichroic beamsplitter wheel constructed according the present invention.

FIG. 3 is a top view showing the arrangement of a high-speed dichroic beamsplitter changer wheel 13 constructed according to one embodiment of the invention. The wheel 13 includes a support plate 52, on which a plurality of dichroic beamsplitter lenses 61–65 are arranged about a center axis 66 of the support plate 52. Each of the lenses 61–65 has distinct filtering properties. In many cases, only two lenses are required, so it is possible to use plain glass in the remaining three spots, or to leave the remaining three spots empty.

Five lenses 61–65 are chosen for this embodiment because it is anticipated that the optimum size of the lenses 61–65 and of the plate 52 is such that spacing for five lenses 61–65 is optimum. This presumes that circular lenses are most readily available at a particular size and in commercial quantities.

According to a particular aspect of the present invention, the lenses 61–65 are round 50 mm dichroic beamsplitter mirrors mounted in the wheel 13. The round 50 mm mirrors are selected because of efficiency, effectiveness and commercial availability. The invention is suitable for use with any size or shape dichroic beamsplitter that matches the optical path of the microscope or other sensing instrument.

Each of those lenses 61–65 are chosen for their filtering properties, which permit sensing of a particular fluorophore. In the case of dichroic lenses, light shorter than a predetermined wavelength is reflected, and light longer than that predetermined wavelength is transmitted. The dichroic wavelength is selected so that the transmission and reflection bands correspond to the Stokes shift of the fluorophore.

If a particular dichroic filter reflects most light below a predetermined wavelength and transmits light above that wavelength, that wavelength can be described as a "cut-off wavelength." Thus if the Stokes shift of a certain fluorophore is $$v [delta]v_1,$$

then the cut-off wavelength of the dichroic filter should match $$v ([delta]v_1/2).$$

The excitation and notch filter wheels 20,21 (FIG. 1) have similar construction as the dichroic wheel 13, and like the dichroic wheel 13 are also motor driven, under the control of the computer 19.

Referring to FIGS. 1–3, the analysis microscope 11 of the present invention operates by transmitting light from the light source 12, through the excitation filter wheel 20, to the dichroic beamsplitter changer wheel 13. The dichroic wheel 13 in turn reflects light from the source 12 through the objective 14 to the specimen 15. Light is reflected from the specimen, and in the case of fluorescence, light is emitted at a wavelength established by the Stokes shift. The light from the specimen, including reflected light and light emitted by fluorescence, is retransmitted through the objective 14 and impinges on the surface of the dichroic wheel 13. Reflected light is again reflected, resulting in that light being absorbed by the housing of the microscope. Light emitted by fluorescence of the type being measured has an emission wavelength, which is longer than the cut-off frequency of the particular dichroic filter lens (one of the elements 61–65) that is in alignment with the optical pathway and therefore passes through the dichroic beamsplitter changer wheel 13. The light passing through the dichroic wheel 13 passes through the emission filter 21 to be sensed by the camera 16.

Thus light reflected from the specimen 15 and retransmitted through the objective is either reflected or transmitted at the dichroic wheel 13. Light from the specimen 15 reflected without a Stokes shift is reflected at the dichroic wheel 13. Light subject to a Stokes shift is transmitted through the dichroic wheel 13 to be detected, i.e. sensed, by the camera 16.

In order to sense multiple fluorophores, the dichroic wheel 13 is rotated in order to select different ones of the lenses 61–65. Normally this would entail a shift between two of the lenses 61–65; however up to five lenses of the cut-off wavelengths 2 may be selected. By using dual cutoff lenses 61–65 or multiple cutoff lenses, it is possible to use one or more of the lenses 61–65 for more than one set of fluorescent Stokes shifts. Since the dichroic wheel 13 can be separately and rapidly shifted along with the excitation and emission wheels 20,21, it is possible to select a set of multiple cutoff wavelengths in each of the lenses 61–65, which are sufficiently different from one another that the multiple cutoffs do not significantly reduce the efficiency of the dichroic effect for any given set of excitation and emission frequencies.

During selection, the motor 17 is used to rapidly position the lenses 61–65 on the dichroic wheel 13 in response to the wheel controller 18 and the computer 19. The computer 19 thereby correlates the selected one of the lenses 61–65, thereby providing an output, which distinguishes different fluorophores. On a visual display, this is depicted in different display colors, which may or may not correspond to the cut-off wavelengths of the lenses 61–65.

Selection of the lenses 61–65 requires that the motor 17 have a position control so that a particular lens 61–65 be placed into position at a given time. In this way, the processing of the camera image is made to correspond to the particular fluorophore being sensed at any given time. Since the motor is able to be rapidly positioned, the time delay between sensing light passed through different ones of the lenses 61–65 is short. This short time is advantageous in that it allows measurement of the fluorophore reflections of multiple fluorophores at nearly the same time.

By using a stepper motor 17 it is possible to precisely position the dichroic wheel 13 so that the particular lens of the set of elements 61–65 is quickly placed into alignment. The stepper motor 17 is sequenced between predetermined ones of the lenses 61–65, thereby allowing multiple scans within a desired time period. While a stepper motor 17 is described, it is also possible to use a galvanometer or synchro motor to establish position.

Figure 4:
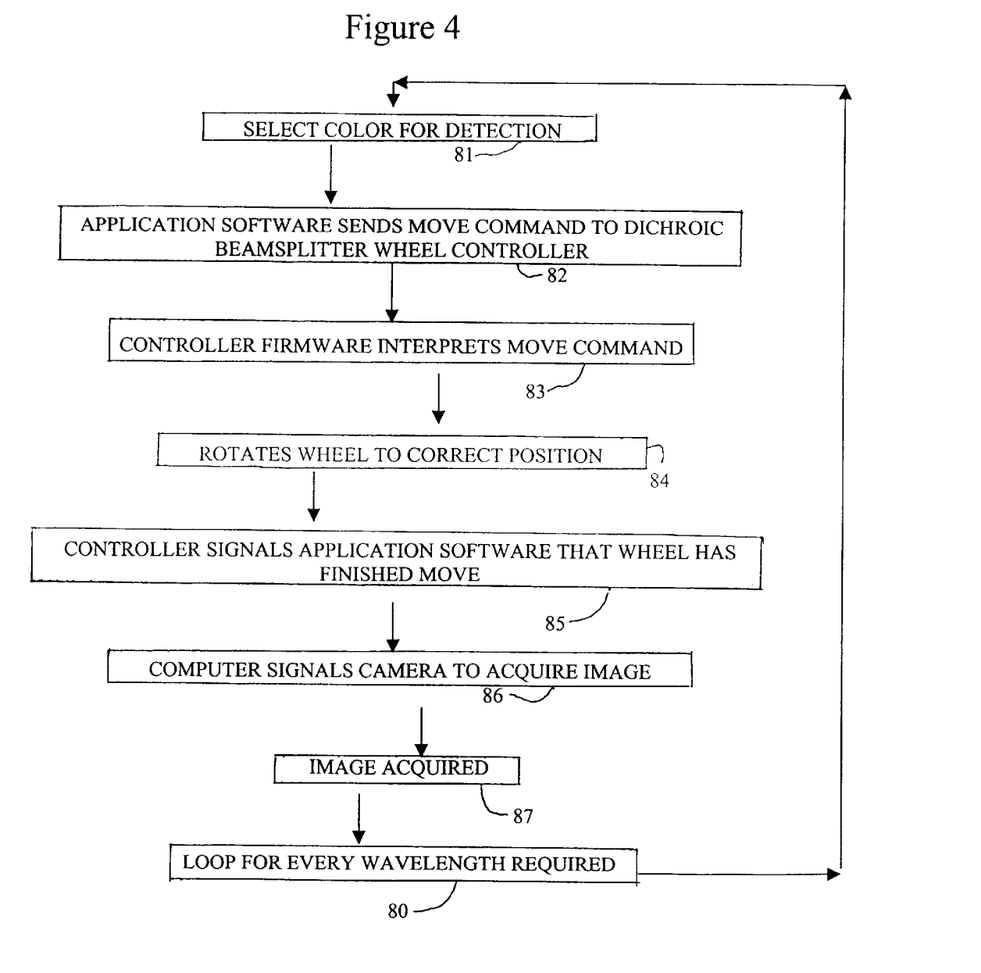
FIG. 4 is a schematic drawing showing control of a microscope according to one aspect of the invention.

FIG. 4 is a schematic drawing showing control for a microscope using a fast dichroic beamsplitter changer according to one aspect of the invention. The figure depicts a loop 80, which represents one complete duty cycle with respect to a predetermined wavelength. The loop 80 is initiated by selecting a color 81. After the selection of the color 81, application software sends a move command 82 to a dichroic beamsplitter wheel controller such as controller 18 in FIG. 1. The controller firmware then interprets 83 the move command 82 and rotates 84 the wheel (13, FIG. 1) to a correct position. The controller 18 then signals 85 application software that wheel 13 has finished moving. In response, the computer (19, FIG. 1) signals 86 the camera (16, FIG. 1) to acquire 87 an image. The image is then acquired 88.

This sequence repeated by executing a loop 80 for every wavelength required.

While the present invention is described in terms of a side-illuminated fluorescent microscope, it is contemplated that other configurations may be used. By way of example, back illumination can be used, in which the dichroic beamsplitter mirror directs nonshifted transmitted light away from the observer or sensor, while transmitting Stokes shifted light for observation. It is also possible to provide a variety of options for using the fluorescent microscope because the dichroic beamsplitter mirror is operated mechanically independently from the other filters.

What is claimed is:

1. A microscope for observing a fluorescent specimen comprising:

an illumination source;

microscope optics in an optical pathway for generating a magnified image of a specimen comprising one or more fluorescent materials;

a beamsplitter changer comprising a plurality of dichroic beamsplitters arranged about a center axis parallel to a line bisecting a predetermined reflection angle to the optical pathway and mounted for rotation about the center axis to allow positioning a selected one of the dichroic beamsplitters in the optical pathway, said optical pathway resulting in reflection of light from the illumination source to the specimen, and transmitting light received through the microscope optics from the specimen, wherein, when the selected dichroic beamsplitter corresponds to a particular fluorescent material under observation, the dichroic beamsplitter reflects light from the illumination source at an excitation wavelength corresponding to the fluorescent material under observation and the dichroic element transmits light shifted in wavelength by a Stokes shift of the fluorescent material under observation;

a motor and motor controller for rapidly effecting the positioning of the dichroic filter by rotating the beamsplitter changer about the center axis; and a computer control, the motor controller responsive to the computer control wherein computer software commands the changer to rotate different ones of the plurality of dichroic beamsplitter elements into the optical pathway to image a particular fluorophore, thereby providing a microscope system in which the device is commanded by the software to change dichroic beamsplitter elements.

2. A microscope as in claim 1, wherein filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source.

3. A microscope as in claim 2, wherein:

a dichroic beamsplitter is provided as a multiple cut-off beamsplitter; and the control function permits selectively changing the dichroic beamsplitters and excitation filter.

4. A microscope as in claim 1, further comprising:

an excitation filter placed between the illumination source and the dichroic beamsplitter, the excitation filter transmitting at least one selected wavelength of light from the illumination source; and an emission filter placed in the optical pathway such that light transmitted through the dichroic beamsplitter passes through the emission filter, light from the illumination source passing to the specimen under observation without passing the emission filter, the emission filter transmitting at least one selectable wavelength of light, at least one of the separate excitation filters and emission filters selectable to change filter wavelength parameters, thereby providing selection of a particular dichroic beamsplitter and at least one of the excitation and emission filters, wherein changing of the filters may be simultaneously executed, except in cases where it us desired to retain the same dichroic beamsplitter while changing said one of the excitation and emission filters.

5. A microscope as in claim 4, wherein filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source.

6. A microscope as in claim 1, wherein the wheel is driven by a DC stepper motor and the DC stepper motor is under computer control.

7. A microscope as in claim 6, wherein filters comprising a first set are used as excitation filters and filters comprising a second set are used as emission filters, said excitation filters and said emission lifters being provided as notch filters which cooperate with respectively selected dichroic beamsplitters in order to selectively image a particular fluorescent source.

8. A microscope as in claim 1, wherein the wheel is driven by a galvanometer and the galvanometer is under computer control.

9. A microscope as in claim 8, wherein filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source.

10. A microscope as in claim 6, wherein:

filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source; and the filters comprising the first set and the filters comprising the second set are changed with a motor controller responsive to the computer control.

* * * * *